3,826,789
PROCESS FOR PRODUCING HYDROCARBON
COMPOSITION
Chikao Yokokawa, Kyoto, Japan, assignor to The
Fujikura Cable Works Ltd., Tokyo, Japan
Filed Dec. 8, 1972, Ser. No. 313,383
Claims priority, application Japan, Dec. 9, 1971,
46/100,039
Int. Cl. C08f 27/02
U.S. Cl. 260—92.8 A          10 Claims

ABSTRACT OF THE DISCLOSURE

A process for producing an hydrocarbon compound from polyvinyl chloride by heating the polyvinyl chloride in an aqueous solution of a basic inorganic material to release chlorine contained in the polyvinyl chloride into said aqueous solution as chlorine ions, to thereby obtain an organic high molecular weight polymeric material mainly comprising carbon, hydrogen and oxygen, is disclosed.

BACKGROUND OF THE INVENTION

1. Field of the invention

The present invention relates to a process concerned with the prevention of environmental pollution.

2. Description of the prior art

Recently the treatment of plastic waste has become an extremely serious problem, and many suggestions have been made for the treatment of plastic waste. Among plastics, polyvinyl chloride is particularly popular, and hence the amount of polyvinyl chloride waste is large as compared with other plastics. Therefore, a process for the treatment of polyvinyl chloride waste has been an important subject in the plastic industry.

As to processes for the treatment of polyvinyl chloride waste, various suggestions have so far been made, which can be roughly classified into two groups, one of which involves destroying the polyvinyl chloride by combustion, the other of which involves utilizing the polyvinyl chloride as a secondary composite material by adding a binder thereto.

However, the former process involves the faults that poisonous hydrogen chloride gas is produced during combustion, a tarry material is formed which interferes with smooth combustion and heat is produced to such an extent that a combustion furnace used for the combustion of polyvinyl chloride suffers damage, while in the latter process the resulting composite material is unprofitable due to its low value and high production cost, and hence it is not a reasonable treating process.

Polyvinyl chloride is a high molecular weight polymer having the composition $(CH_2=CHCl)_n$, and is itself comparatively chemically stable. In addition, since it can provide composite materials having physical properties of an extremely wide range when compounded with various plasticizers or shape-forming materials, it is widely utilized.

Little is known, however, about the decomposition reaction of polyvinyl chloride which is required in the treatment of polyvinyl chloride waste, except for the pyrolysis reaction. That is, from the viewpoint of preventing the deterioration of polyvinyl chloride in practical applications, the dehydrochlorination reaction thereof has been under examination, and the reaction of polyvinyl chloride with a basic organic solvent has been studied with respect to this matter. However, the reaction of polyvinyl chloride with a hot aqueous solution of a basic inorganic material has not yet been known at all.

SUMMARY OF THE INVENTION

In the course of studying the reaction of various high molecular weight polymer compounds in hot water or a hot basic aqueous solution, the inventor found that polyvinyl chloride reacts with a hot aqueous solution of a basic inorganic material to dechlorinate with ease. As the result of extensive studies based on the above knowledge, the inventor reached the present invention.

BRIEF DESCRIPTION OF THE DRAWINGS

FIGS. 1–4 are graphs showing the relationship between the reaction time of polyvinyl chloride and the dechlorination ratio thereof, wherein FIG. 1 shows the results of reaction at 220° C., 240° C. and 285° C. in 1N NaOH; FIG. 2 shows the results of reaction at 180° C., 200° C. and 220° C. in 1N $NH_4OH$; FIG. 3 shows the results of reaction 220° C. in 1N $Ca(OH)_2$, at 200° C. and 220° C. in 1N $Ca(OH)_2+0.1N$ $(NH_4)_2SO_4$, at 220° C. in 1N NaOH $+0.1$ NaOH$+0.1N$ $NH_4NO_3$; and at 240° C. in 1N $Ca(OH)_2+0.1N$ $(NH_4)_2SO_4$. FIG. 4 shows the results for a polyvinyl composite material (water pipe) reacted at 230° C. in 1N $NH_4OH$. In FIGS. 1–4 the plot is percent chlorine eluated versus time.

DETAILED DESCRIPTION OF THE INVENTION

Figure 1:
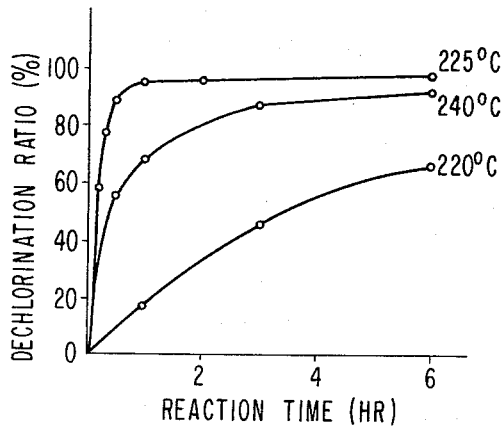

The present invention relates to a process for the treatment of polyvinyl chloride waste which is characterized in that polyvinyl chloride is reacted in a hot aqueous solution of a basic inorganic material to release the chlorine contained in the polyvinyl chloride into the aqueous solution as chlorine ions, to thereby convert the polyvinyl chloride to an organic high molecular weight polymeric compound mainly comprising carbon, hydrogen and oxygen, with traces of nitrogen and chlorine being present. More particularly, the present invention is a process for producing an organic high molecular weight polymeric compound mainly comprising carbon, hydrogen, and oxygen which is characterized in that polyvinyl chloride is heated at about 180 to about 300° C. to react in a hot aqueous solution of one or more basic inorganic materials such as an aqueous ammonia solution, an aqueous alkali metal hydroxide solution, an aqueous alkaline earth metal oxide solution or an aqueous solution of an alkali metal hydroxide or an alkaline earth metal hydroxide to which a catalytic amount of an ammonium salt or ammonia, or a combination thereof has been added, in which case the reaction is markedly accelerated to thereby release chlorine contained in the polyvinyl chloride into the aqueous solution as chlorine ions.

As will be clear from the discussion hereafter offered, the aqueous solution of one or more basic inorganic materials which is used in the present invention is operable over the entire alkaline pH range, that is, from a pH greater than 7 to a pH of 14. Generally speaking, however, the higher the pH the more preferred the results obtained are. At least one mole of basic inorganic material should be present for every mole of chlorine present in the polyvinyl chloride. For commercial operation a minimum of 2 moles of basic inorganic material will be used per mole of chlorine in the polyvinyl cholride. Again, the general rule is that the stronger the aqueous solution of basic inorganic material is (in terms of the amount of basic inorganic material) the more preferred the results obtained are.

In those embodiments of the present invention where ammonia and/or an ammonium salt is added in catalytic proportions to an alkali metal hydroxide or alkaline earth metal oxide, or mixture thereof, generally at least 0.2 mole of ammonia or the ammonium salt must be added per mole of the basic inorganic material to achieve a significant catalytic effect. In view of the relative low cost of such materials and the beneficial results obtained, usually greater amounts will be used though generally no more than about 2 moles of ammonium salt will be added per mole of alkali metal hydroxide or alkaline earth metal hydroxide.

In the case where ammonia is added to the alkali metal and/or alkaline earth metal hydroxide(s) for its catalytic effect, the system can be viewed as a two basic inorganic material system, though the results obtained are better than with an equivalent amount of alkali metal hydroxide, alkaline earth metal hydroxide or ammonia alone.

Polyvinyl chloride which can be treated in the present invention is not limited to pure polyvinyl chloride but includes composite materials containing polyvinyl chloride as a component. As the following discussion regarding the operation of the present invention will make clear, there is substantially no limitation on the percentage of polyvinyl chloride which is present in the composite materials so long as the aqueous solution of a basic inorganic material can contact the polyvinyl chloride. However, it will be apparent to one skilled in the art that with composite materials where the percentage of polyvinyl chloride is extremely low the present invention will not be as economically advantageous as it will be in treating high percentage polyvinyl chloride materials. Most polyvinyl chlorides produced at present have a polymerization degree of from about 600 to about 3,000. Thus, the process of the present invention will find greatest application in treating such materials because they will most commonly be encountered in polyvinyl chloride waste-containing materials. The present invention is not, of course, limited thereto.

The alkali metal hydroxides which are most preferably used are sodium hydroxide and potassium hydroxide, and, as examples of alkaline earth metal hydroxides which can be used there are calcium hydroxide, barium hydroxide, magnesium hydroxide, etc. These materials need not necessarily be pure, and materials containing carbonates or like salts, oxides or halides of these metals are sufficient to achieve similar action and effects so long as sufficient basic inorganic materials are present to provide the dechlorinating action of the present invention. Needless to say, one would generally avoid excessively great amounts of materials inert to the reaction because of the post-reaction separation problem which might be posed.

Preferred materials which provide $NH_4^+$ ions in solution are ammonia and ammonium salts such as ammonium chloride, ammonium phosphate, ammonium carbonate, ammonium nitrate and the like.

In the present invention, the above-described aqueous solutions may be used as combination of two or more thereof.

Considering the mechanism of the action of the aforesaid various aqueous solutions of basic inorganic materials on the polyvinyl chloride, it is believed, based on the obtaining of a product containing large proportion of hydroxy groups as in Example 11, that a hydrolysis reaction takes place with a simultaneous dehydrochlorination.

The reaction of the present invention is conducted by adding polyvinyl chloride to a hot basic aqueous solution and heating at from about 180 to about 300° C. If desired, the polyvinyl chloride may be shredded prior to reaction to reduce the particle size thereof. On the addition of polyvinyl chloride to the hot aqueous solution of a basic inorganic material the mixture may be stirred, but mere addition without stirring does not cause any difference in the action and the effects of the present invention. In the present invention, the heating condition is limited to about 180 to about 300° C. for the following reasons: If the temperature is less than about 180° C., the rate at which the chlorine contained in the polyvinyl chloride is released becomes smaller than is practical, and hence such temperature is unsuitable for attaining the objects of the present invention. On the other hand, if the temperature is above about 300° C., a secondary decomposition of the hydrocarbon composition produced occurs, resulting in considerable coloring of the product, and thus a product with a definite composition becomes difficult to obtain. Preferred reaction conditions in accordance with the present invention fall within the range of from 190 to 250° C. with heating for at least 30 minutes to about 5 hours.

The pressure of operation is not overly critical, and elevated pressures are used in order to avoid volatilization of the system involved. It will be obvious to one skilled in the art that operation at atmospheric pressure would be feasible, but high volatilization would occur and complicated recycling apparatus would be required. For this reason, commercial operation will always be at elevated pressures, for instance, when operation is at about 180° C. a pressure of about 10 atmospheres will be used and when operation is at about 300° C. the pressure of about 85 atmospheres will be used. The pressure will vary depending upon the basic inorganic material which is being used, but generally speaking higher pressures are required for ammonia because of its relatively high volatility.

The heating is conducted in an autoclave under saturated total vapor pressure by maintaining the system at a temperature within the above range for from about 5 minutes to about 6 hours. After the completion of the reaction, the contents are removed from the autoclave, solid material is filtrated, and the resulting solid material is dried. The solid material obtained by such procedures is a hydrocarbon composition mainly comprising carbon, hydrogen and oxygen.

When the thus obtained hydrocarbon material, i.e., the dechlorinated material, is burned, the problems heretofore experienced in burning polyvinyl chloride are not encountered, i.e., the production of hydrogen chloride gas and tarry material is lowered, and damage to the combustion furnace due to the high heat can be prevented.

Furthermore, judging from its properties, the hydrocarbon material obtained by the present invention can be utilized as a useful carbon material source. That is, since the resulting hydrocarbon material comprises carbon, hydrogen and oxygen, and contains a three-dimensional cross-linked structure, it can be utilized, for example, as a raw material for an ion-exchange material and as a source of various carbonaceous materials such as active carbon.

In addition, in the case of using, for example, calcium hydroxide as the basic inorganic material to form the aqueous solution of a basic inorganic material, chlorine contained in polyvinyl chloride is fixed as calcium chloride, which can be recovered as a useful product.

Thus, the process of the present invention, which is characterized in that chlorine contained in polyvinyl chloride is released into the aqueous solution of a basic inorganic material as chlorine ions, will find great industrial use as a process for the treatment of polyvinyl chloride waste or waste composite materials mainly comprising polyvinyl chloride.

The present invention will be described by reference to several Examples which are not to be taken as limitative of the invention.

EXAMPLE 1

Three separate runs were performed. In the first run, 50 ml. of a 1N NaOH aqueous solution was added to 1 g. of pure polyvinyl chloride $(CH_2=CHCl)_n$, $n=1100$ (manufactured by Wako Pure Chemical Industry, Ltd.) and the resulting mixture was charged into a 100 ml. autoclave and heated without stirring under saturated total vapor pressure for the system. The first run was at 220° C. and was conducted for 130 minutes with percent chlorine ion eluted (explained below) measured at 5, 10, 30, 60, 120 and 130 minutes. The second run was at 240° C. for 360 minutes with measurements of chlorine ion eluted at 30, 69, 180, 270, and 360 minutes, and the third run at 285° C. for 360 minutes with measurements of chlorine ion eluted at 60, 180 and 360 minutes.

After the completion of each reaction, the contents of the autoclave were taken out and the solid material filtrated out. Thereafter, the aqueous layer was neutralized with $HNO_3$, and chlorine ion therein was determined according to Mohr's method. The percentages of the amount of chlorine ion eluted into the aqueous solution based on the amount of chlorine contained in the starting sample polyvinyl chloride (hereinafter referred to as the "dechlorination ratio") are illustrated in FIG. 1.

From FIG. 1, it is clear that in the reaction of 1N NaOH, 95% and 90% of chlorine is released in the reaction at 285° C. for 60 minutes and in the reaction at 240° C. for 270 minutes, respectively, and reaction at 220° C. for 3 hours was necessary to release 55% of the chlorine.

EXAMPLE 2

The procedure of Example 1 was followed using 1N KOH at 285° C. The dechlorination ratio after reaction for 60 minutes was 96%.

EXAMPLE 3

The procedure of Example 1 was followed using 0.5N NaOH at 285° C. The amount of polyvinyl chloride was 0.5 g. The reaction was conducted for 30, 60, 120 and 360 minutes. The corresponding dechlorination ratios were 87.6, 90.4, 94.5, and 96.5% respectively.

EXAMPLE 4

Figure 2:
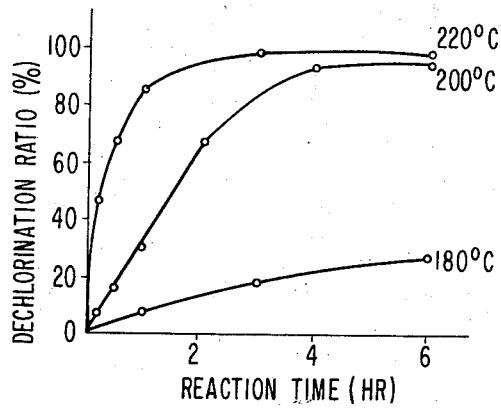

The procedure of Example 1 was followed using 1N $NH_4OH$. Reaction temperatures of 180, 200, 220, 230 and 260° C. were selected, and reaction was conducted for 60, 180, and 360 minutes at 180° C.; 10, 30, 60, 120, 240, and 360 minutes at 200° C.; 10, 30, 60, 180, and 360 minutes at 220° C.; 120 minutes at 230° C.; and 180 minutes at 260° C. The dechlorination ratios for reaction at 180, 200 and 220° C. are shown in FIG. 2, from which it can be seen that the dechlorination reaction in 1N $NH_4OH$ proceeded faster than in NaOH or KOH. The dechlorination ratios for reaction at 230° C. for 180 minutes and 240° C. for 120 minutes were 95% and 94%, respectively. In addition, the N content of the solid organic materials obtained by reaction at 220° C. for 180 minutes at 230° C. for 180 minutes and at 260° C. for 120 minutes were 2.10, 1.90, and 4.27%, respectively.

EXAMPLE 5

Figure 3:
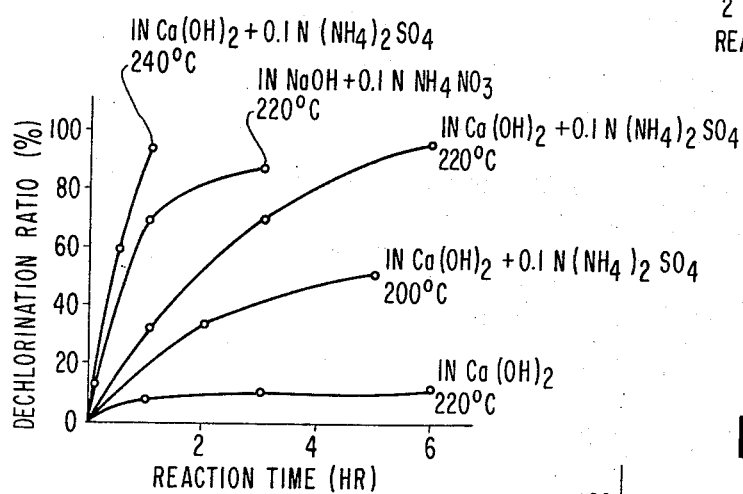

The procedure of Example 1 was followed using 1N $Ca(OH)_2$ with reaction at 220° C. for 60, 180 and 360 minutes. The results obtained are illustrated in FIG. 3.

EXAMPLE 6

The procedure of Example 5 was followed with further adding a catalytic amount of $(NH_4)_2SO_4$ or $NH_4NO_3$. That is, 50 ml. of 1N $Ca(OH)_2$ was added to 1 g. of pure polyvinyl chloride and $(NH_4)_2SO_4$ or $NH_4NO_3$ was added thereto so that the concentration thereof was 0.1N. Then, reaction was conducted at 200, 220 and 240° C. The results obtained in using $(NH_4)_2SO_4$ were shown in FIG. 3. With regard to $NH_4NO_3$, reaction was conducted at 200° C., 220° C. and 240° C. for 60 minutes and as a result, dechlorination ratios of 7.5, 47.0, and 95.2% were obtained, respectively. These values almost coincide with the corresponding results obtained with $(NH_4)_2SO_4$. Therefore, it is clear that the presence of $NH_4^+$ remarkably accelerates the dechlorination reaction.

EXAMPLE 7

Following the procedure of Example 6, $NH_4NO_3$ was added to 1N NaOH so that the concentration thereof was 0.1N, and reaction was conducted at 220° C. The results obtained are shown in FIG. 3. It was confirmed that as in Example 6 $NH_4^+$ markedly accelerated the dechlorination reaction.

EXAMPLE 8

The procedure of Example 1 was followed using a mixed aqueous solution of 25 ml. of 1N NaOH and 25 ml. of 1N $Ca(OH)_2$. After reaction at 240° C. for 180 minutes the dechlorination ratio amounted to 80%.

EXAMPLE 9

The procedure of Example 1 was followed using a mixed aqueous solution of 25 ml. of 1N NaOH and 25 ml. of 1N $NH_4OH$. After reaction at 200° C. for 180 minutes, the dechlorination ratio amounted to 92.5%.

EXAMPLE 10

Figure 4:
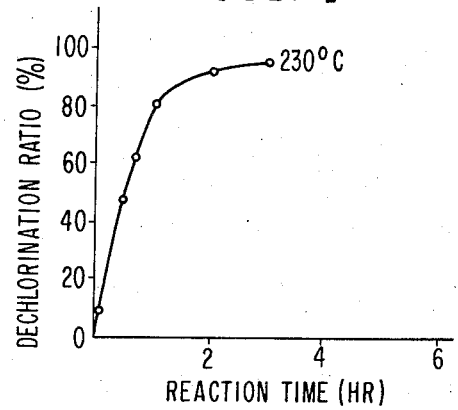

A water pipe made from polyvinyl chloride of an average degree of polymerization of 1,100 (containing a plasticizer (dioctyl phthalate) and a filler (calcium carbonate); Cl content: 34.9%) was formed into a mass weighing about 1 g., 50 ml. of 1N $NH_4OH$ was added to the mass, and reaction was conducted at 230° C. at saturated total vapor pressure. The results obtained are shown in FIG. 4, from which it can be understood that the composite material can be dechlorinated with ease in a manner similar to pure polyvinyl chloride. Additionally, in this case, though the organic material produced remained in a massive state, it was deformed from its original form, and was so brittle that it could be pulverized with ease.

EXAMPLE 11

Figure 5:
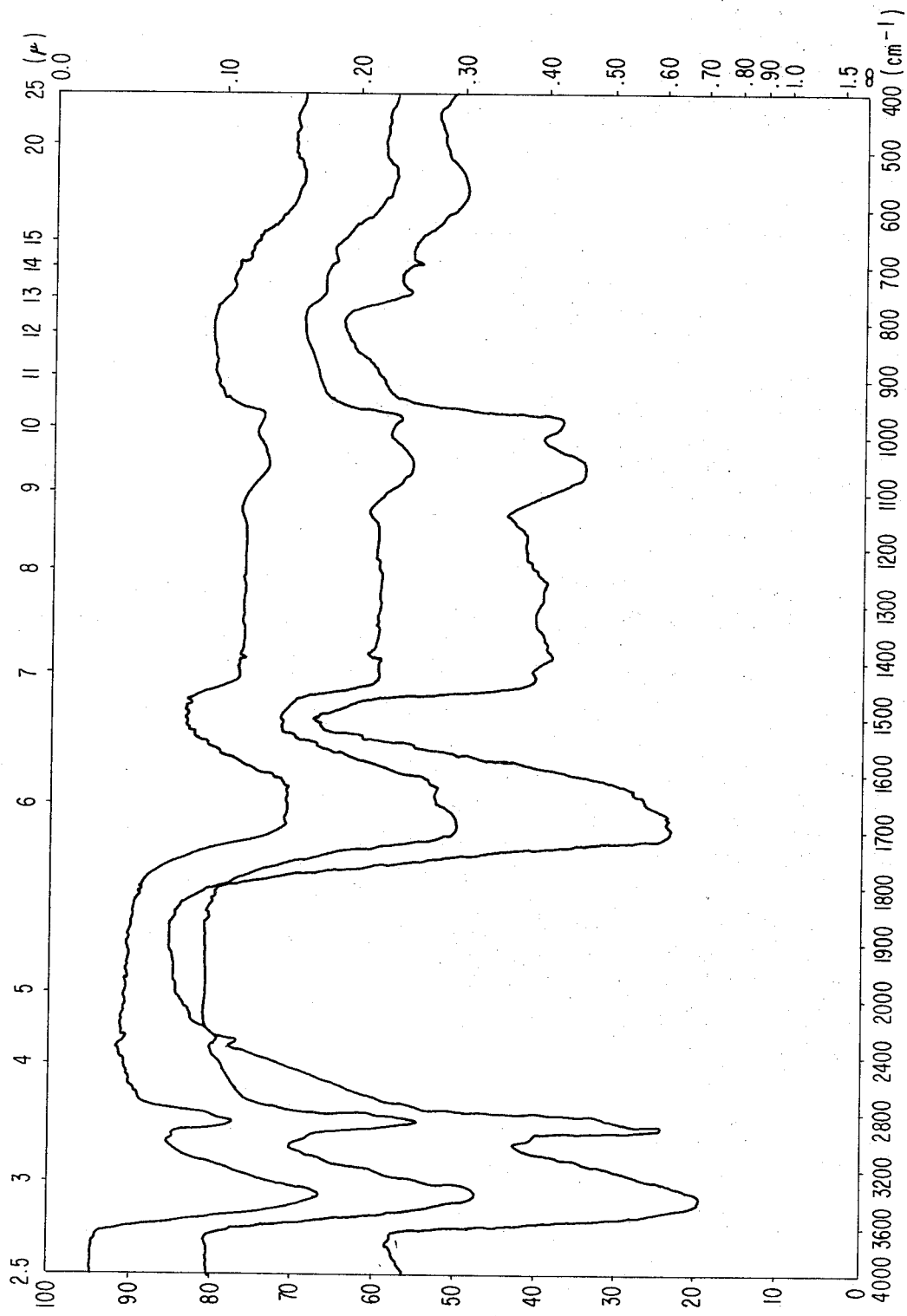
FIG. 5 is the infrared spectrum obtained from the product in Example 11.

The infrared spectrum of a dechlorinated material is shown in FIG. 5. This sample was obtained by the reaction of pure polyvinyl chloride of a degree of polymerization of 1,100 in 1N $NH_4OH$ at 220° C. for 180 minutes. The dechlorination ratio in the reaction was 96.0%. This spectrum was obtained according to the KBr pellet method. The spectrum is characterized by absorptions at 3300 cm.$^{-1}$, 1700 cm.$^{-1}$, 1060 cm.$^{-1}$ and 980 cm.$^{-1}$. These absorptions are not observed in pure polyvinyl chloride, and they show the formation of an OH group, a carbonyl group and an ether type —O— bond. In addition, an absorption at 700 cm.$^{-1}$ due to a C—Cl bond, which is the characteristic of pure polyvinyl chloride, is greatly reduced, which shows the occurrence of a dechlorination reaction. The absorption at 570 cm.$^{-1}$ can be assigned to either an aromatic nucleus or aliphatic ether.

Though the structure of the dechlorinated product cannot decisively be determined based on the above-described spectrum alone, it can be seen that the reaction of the present invention includes an hydrolysis of the polyvinyl chloride, that a carbonyl or ether type —O— bond is formed by the rearrangement of an OH group or a dehydration condensation, and that the present invention is accompanied by the formation of a conjugated double bond system due to dehydrochlorination, since there is observed an absorption indicative of the aromatic nucleus.

EXAMPLE 12

When the dechlorinated product used as a sample in Example 11 was heated to 900° C. at a heating rate of 10° C./min., there was provided a carbonized product at 40% yield. The formation of carbonized product in such a high yield, the relative hardness of the carbonized product and the fact that the product would not dissolve upon heating are all proof of the presence of a three-dimensional cross-linked structure.

While the invention has been described in detail and with reference to specific embodiments thereof, it will be apparent that various changes can be made therein without departing from the spirit and scope thereof.

What is claimed is:

1. A process for producing a hydrocarbon composition which comprises heating, at a temperature of from about 180 to about 300° C., polyvinyl chloride in an aqueous solution of a basic inorganic material to react and release chlorine contained in the polyvinyl chloride into said aqueous solution as chlorine ions, to thereby obtain an organic high molecular weight polymer compound mainly comprising carbon, hydrogen and oxygen, said basic inorganic material initially being present in an amount of at least one mole per mole of chlorine in the polyvinyl chloride.

2. A process as described in Claim 1 wherein at least one or more members selected from the group consisting of ammonia, an alkali metal hydroxide, an alkaline earth metal hydroxide, and an alkali metal hydroxide or an alkaline earth metal hydroxide to which a catalytic amount of at least one ammonium salt and/or ammonia has been added, are used as said basic inorganic material.

3. A process as described in Claim 1 wherein the heating is conducted under saturated total vapor pressure at a temperature of from about 180 to about 300° C.

4. A process as described in Claim 3 wherein the heating is a temperature of from 190° C. to 250° C.

5. A process as described in Claim 4 wherein the heating is conducted for from about 30 minutes to about 5 hours.

6. A process as described in Claim 1 wherein the pH is from greater than 7 to 14.

7. A process as described in Claim 1 wherein at least 2 moles of said basic inorganic material are present per 1 mole of chlorine in the polyvinyl chloride.

8. A process as described in Claim 2 wherein a catalytic amount of at least one ammonium salt or ammonia is added in an amount of at least 0.2 mole per mole of member selected from the group consisting of an alkali metal hydroxide, an alkaline earth metal hydroxide or an alkaline earth metal/alkali metal hydroxide mixture.

9. A process as described in Claim 1 wherein the polyvinyl chloride has a degree of polymerization of from about 600 to about 3,000.

10. A process as described in Claim 1 wherein heating is for 5 minutes to about 6 hours.

References Cited
UNITED STATES PATENTS

| | | | |
|---|---|---|---|
| 2,536,114 | 1/1951 | Weaver et al. | 260—87.1 |
| 2,365,400 | 12/1944 | Fikentscher | 260—88 |
| 2,572,315 | 10/1951 | Campbell | 88—65 |

JOSEPH L. SCHOFER, Primary Examiner

J. KIGHT III, Assistant Examiner

U.S. Cl. X.R.

260—92.8 W